US010846329B1

(12) United States Patent
Nicotera et al.

(10) Patent No.: US 10,846,329 B1
(45) Date of Patent: Nov. 24, 2020

(54) MANAGEMENT ENGINE FOR MISSION RELEVANT IMAGERY

(71) Applicant: Architecture Technology Corporation, Minneapolis, MN (US)

(72) Inventors: Paul Nicotera, Ithaca, NY (US); Kenneth McVearry, Dewitt, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 283 days.

(21) Appl. No.: 15/885,194

(22) Filed: Jan. 31, 2018

(51) Int. Cl.
*G06F 16/58* (2019.01)
*G06F 16/51* (2019.01)
*G06F 16/11* (2019.01)
*G06T 1/00* (2006.01)

(52) U.S. Cl.
CPC ........ *G06F 16/5866* (2019.01); *G06F 16/125* (2019.01); *G06F 16/51* (2019.01); *G06T 1/0007* (2013.01)

(58) Field of Classification Search
None
See application file for complete search history.

(56) References Cited

U.S. PATENT DOCUMENTS 8,145,677 B2 * 3/2012 Al-Shameri ........ G06F 16/3347
707/802
10,146,809 B2 * 12/2018 Goeser .................. G06F 16/215
2010/0223276 A1 * 9/2010 Al-Shameri ......... G06K 9/0063
707/769
2013/0159305 A1 * 6/2013 Starks ..................... G06F 16/35
707/737
2015/0066939 A1 * 3/2015 Misra .................... G06F 16/355
707/739
2016/0004730 A1 * 1/2016 Goeser .................. G06F 16/215
707/692
2016/0055504 A1 * 2/2016 Murray ................... G06T 13/80
705/7.34

OTHER PUBLICATIONS

Dillow, "What Happens When You Combine Artificial Intelligence and Satellite Imagery," fortune.com, Mar. 30, 2016, 4 pp.
Gerwitz, "My Infuriatingly Unsuccessful Quest for a Good Media Asset Management Tool," zdnet.com. Apr. 1, 2013, 8 pp.

(Continued)

*Primary Examiner* — Nancy Bitar
(74) *Attorney, Agent, or Firm* — Shumaker & Sieffert, P.A.

(57) ABSTRACT

At least one processor of a computing device may determine relevancy metadata associated with of images stored in an imagery processing system. The at least one processor may determine one or more active retention policies for the images based at least in part on the relevancy metadata, wherein the one or more active retention policies include one or more rulesets that are applied to the relevancy metadata. The at least one processor may determine retention priority values associated with the images stored in the imagery processing system based at least in part on the one or more active retention policies. The at least one processor may manage retention of the images in the imagery processing system based at least in part on the retention priority values associated with the images.

15 Claims, 7 Drawing Sheets

(56) References Cited

OTHER PUBLICATIONS

Cordova et al., "Motion Imagery Processing and Exploitation (MIPE)," RAND Project Air Force, 2013 (Applicant points out, in accordance with MPEP 609.04(a), that the year of publication, 2013, is sufficiently earlier than the effective U.S. filing date, 2018, so that the particular month of publication is not in issue.), 55 pp.

"Department of the Navy Implementation and Operation of the Defense Acquisition System and the Joint Capabilities Integration and Development System," SECNAV Instruction 5000.2E, Sep. 1, 2011, 236 pp.

"Test and Evaluation," NAVSEA Instruction 3960.2D, Apr. 22, 1988, 11 pp.

"Online Image Management Software: Streamline your Creative Workflows with Image Management," webdam.com, retrieved from https://webdam.com/online-image-management/ on Jan. 31, 2018, 5 pp.

Loechner, "90% of Today's Data Created in Two Years," mediapost.com, Dec. 22, 2016, 4 pp.

"Global Geographic Information System (GIS) Market to Witness 10.1% CAGR During 2017-2023," psmarketresearch.com, May 2017, 4 pp.

Cegielka et al., "Beyond the Cambridge Compromise algorithm towards degressively proportional allocations" Jan. 24, 2017, 16 pp.

\* cited by examiner

MANAGEMENT ENGINE FOR MISSION RELEVANT IMAGERY

GOVERNMENT LICENSE RIGHTS

This invention was made with government support under N68335-17-C-0451 awarded by the United States Department of Defense. The government has certain rights in the invention.

BACKGROUND

Imagery processing systems may store and manage imagery (e.g. image files), and may enable such imagery to be viewed, edited, processed, analyzed, tagged, categorized, and the like. An imagery processing system may receive imagery from a variety of data sources. Imagery received by the imagery processing systems may have a relatively large size (e.g., several hundred megabytes), and imagery processing system may receive such imagery at a relatively high rate (e.g., several hundred images per second). Given the rate at which the imagery processing system receives the imagery, and the relatively large size of the imagery, the imagery processing system may manage its storage by deleting imagery stored in its associated storage space in order to make room for newly received imagery.

SUMMARY

In general, aspects of the present disclosure are directed to techniques for intelligent management of imagery stored in imagery processing systems and the storage space of imagery processing systems. An imagery management engine may generate relevancy metadata and may optimize and prioritize data retention strategies of the imagery processing system based on the relevancy metadata to meet various operational requirements.

In one example, the disclosure is directed to a method. The method includes determining, by at least one processor, relevancy metadata associated with images stored in an image processing system. The method further includes determining, by the at least one processor, one or more active retention policies for the images based at least in part on the relevancy metadata, wherein the one or more active retention policies include one or more rulesets that are applied to the relevancy metadata. The method further includes determining, by the at least one processor, retention priority values associated with the images stored in the image processing system based at least in part on the one or more active retention policies. The method further includes managing, by the at least one processor, retention of the images in the image processing system based at least in part on the retention priority values associated with the images.

In another example, the disclosure is directed to a computing system. The computing system includes a computer readable storage device. The computing system further includes at least one processor configured to: determine relevancy metadata associated with images stored in an image processing system; store the relevancy metadata in the computer readable storage device; determine one or more active retention policies for the images stored in the image processing system based at least in part on the relevancy metadata, wherein the one or more active retention policies include one or more rulesets that are applied to the relevancy metadata; determine retention priority values associated with the images stored in the image processing system based at least in part on the one or more active retention policies; and manage retention of the images in the image processing system based at least in part on the retention priority values associated with the images.

In another example, the disclosure is directed to a computer readable storage medium containing instructions. The instructions, when executed by at least one processor of a computing device, causes the at least one processor to perform operations including: determining relevancy metadata associated with of images stored in an image processing system; determining one or more active retention policies for the images based at least in part on the relevancy metadata, wherein the one or more active retention policies include one or more rulesets that are applied to the relevancy metadata; determining retention priority values associated with the images stored in the image processing system based at least in part on the one or more active retention policies; and managing retention of the images in the image processing system based at least in part on the retention priority values associated with the images.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques for intelligent management of imagery stored in imagery processing systems and intelligent management of the storage space of imagery processing systems. An imagery management engine may manage the imagery stored in imagery processing systems and manage the storage space of the imagery processing system by generating retention priority values that are associated with the imagery stored in the imagery processing system. The imagery management engine may determine which imagery to delete from the imagery processing system based in part on the retention priority values associated with the imagery.

The imagery management engine may generate relevancy metadata that may be used by the imagery management engine along with image metadata. Users may use the relevancy metadata to search the imagery processing system and to access relevant imagery, and may also utilize the relevancy metadata and the image metadata to create and/or modify user-defined retention policies. The imagery management engine may create retention policies that determine the retention priority of the imagery based upon the relevancy metadata and the image metadata. The imagery management engine may utilize the retention priority of imagery stored in the imagery processing system, as determined using the retention policies, to manage the retention of imagery stored in the imagery processing system.

Figure 1:
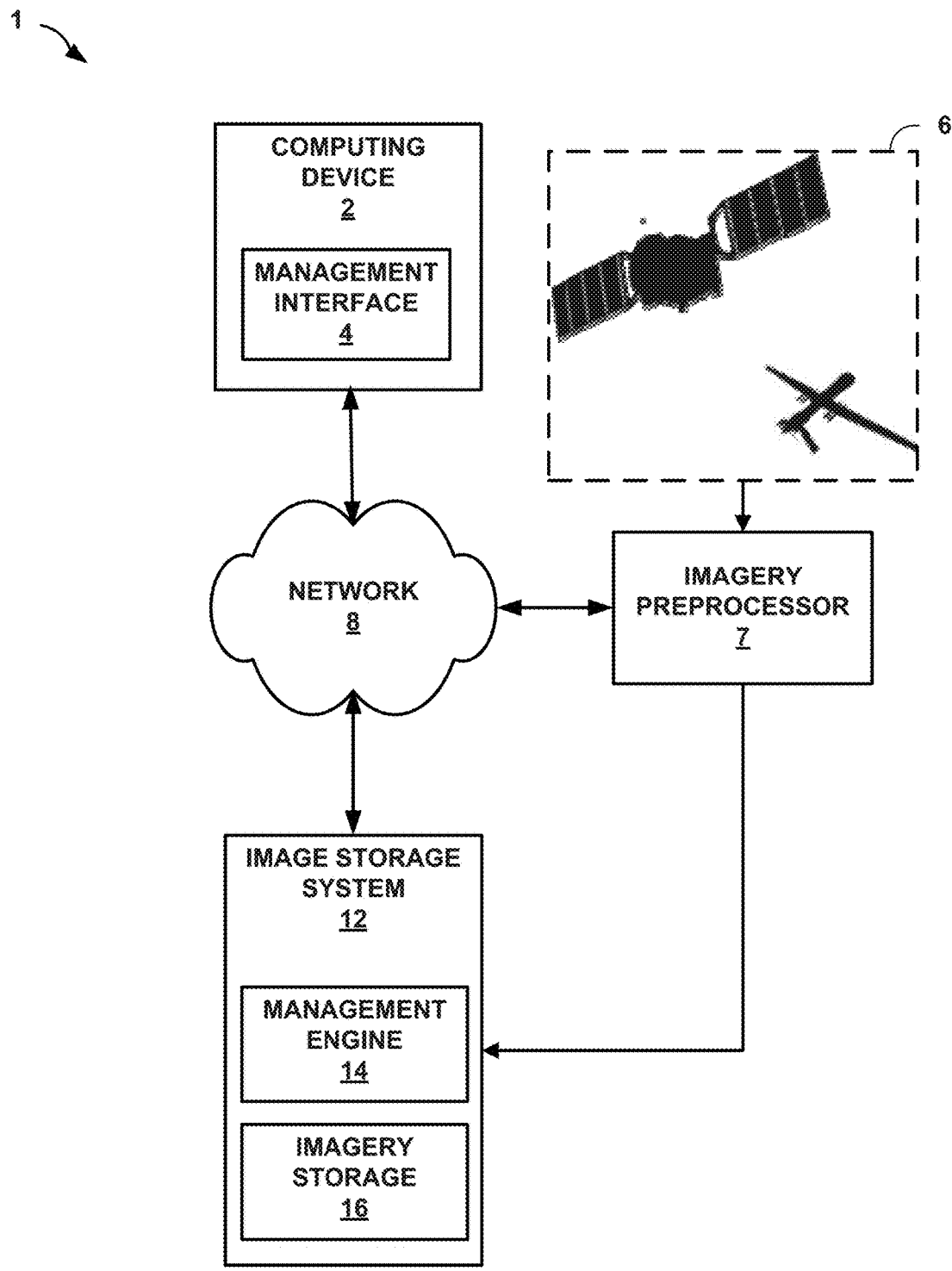
FIG. 1 is a block diagram illustrating an environment in which a management interface and a management engine are utilized to manage imagery in an imagery processing system that includes an image storage system.

FIG. 1 is a block diagram illustrating an environment in which a management engine is utilized to manage imagery in an imagery processing system. As shown in FIG. 1, imagery processing system 1 may include computing device 2 and image storage system 12. Computing device 2 may communicate with image storage system 12 via network 8 to access imagery stored in image storage system 12. A user may interact with image storage system 12 via interactions with management interface 4 that executes on computing device 2.

Computing device 2 may be operably coupled to image storage system 12 via network 8. Network 8 may be any public or private communications network, such as the Internet, a cellular data network, dialup modems over a telephone network, a private local area network (LAN), leased lines, satellite link, or a combination of such communication networks. Network 8 may include one or more network switches, network hubs, network routers, modems, or any other suitable network equipment that are operably intercoupled to provide for the exchange of information between image storage system 12 and computing device 2. Network 8 may be a wired network or a wireless network. Computing device 2, network 8 and image storage system 12 may all be either in a single facility or widely dispersed in two or more separate locations anywhere in the world, in different examples.

Computing device 2 and image storage system 12 may transmit and receive data across network 8 using any suitable communication techniques. Computing device 2 and image storage system 12 may each be operably coupled to network 8 using respective network links. The links coupling computing device 2 and image storage system 12 to network 8 may include Ethernet, asynchronous transfer mode (ATM) networks, or other suitable types of wired and/or wireless network connection.

In some examples, image storage system 12 may be a single computing device such as a computing server, mainframe computer, and the like. In other examples, image storage system 12 may be implemented by multiple computing devices, servers, mainframes, or systems working to perform the actions of a server system (e.g., cluster computing or cloud computing). In some examples, image storage system 12 may operate as all or part of a real or virtual server, and may be or incorporate a workstation, server, mainframe computer, notebook or laptop computer, desktop computer, tablet, smartphone, feature phone, or other programmable data processing apparatus of any kind.

Examples of computing device 2 may include, but are not limited to, portable, mobile, or other devices, such as mobile phones (including smartphones), wearable devices (including smart watches), laptop computers, desktop computers, tablet computers, smart television platforms, personal digital assistants (PDAs), server computers, mainframes, and the like.

Data sources 6 may also be operably coupled to image storage system 12 via network 8 or via other means (e.g., via buses, hardware interfaces, and the like) to send imagery data to image storage system 12 for storage in image storage system 12. When data sources 6 is coupled to image storage system 12 via network 8, data sources 6 and image storage system 12 may transmit and receive data across network 8 using any suitable communication techniques, similar to that used to transmit and receive data between computing device 2 and image storage system 12.

Data sources 6 may be any source of imagery data. Examples of data sources 6 may include, but are not limited to imaging satellites, unmanned aerial vehicles, drones, aircrafts, infrared cameras, image capture devices (e.g., cameras), as well as other suitable sources of imagery data such as computing devices, storage devices (e.g., hard drives), high-capacity imagery libraries, and the like. In some examples, imagery may include images of geographic regions, images of geographic areas of interest, images of objects within such geographic regions and areas, and the like. In other examples, imagery may include any other images captured by data sources 6. The imagery data may span a range of collection conditions, such as times of day (e.g., light and dark), seasons of the year (e.g., weather conditions), electromagnetic spectrum (e.g., visible, infrared, radar, etc.), perspectives (e.g., viewing angles, elevations, positions of the sun and the horizon, etc.), and exposures (e.g., time-lapse).

In some examples, data sources 6 may transmit imagery to imagery preprocessor 7. Imagery preprocessor 7 may be a device, processor, computing device, and the like that performs image preprocessing on the imagery data before transmitting the processed imagery to image storage system 12. Examples of image preprocessing may include computing, integrating, and/or associating imagery metadata to the imagery to describe geographical conditions, sensor conditions, the time, the date, elevation conditions, orientation conditions, and/or other relevant conditions under which the associated imagery was collected or obtained. Other examples of image preprocessing may also include color balancing, contrast enhancement, resizing, cropping, scaling, resampling, compressing, and the like of the imagery. Such imagery metadata may be packaged with one or more related images within a file container format that provides standardized metadata representations, such as National Imagery Transmission Format (NITF) files. In some examples, imagery preprocessor 7 may be included or be a part of data sources 6. Throughout this disclosure, when image storage system 12 is described as receiving the imagery from data sources 6, it should be understood that such a description may encompass image storage system 12 receiving the imagery from imagery preprocessor 7.

Image storage system 12 may store imagery data in imagery store 16, and may be a part of imagery processing system 1 or be operably coupled to imagery processing system 1 (e.g., via network 8). Imagery storage 16 may be any suitable storage device or devices for storing imagery data. Imagery may include images such as photographs, visual images, infrared images, synthetic aperture radar images, multispectral images, color images, frames of videos, or other suitable images, along with data associated with the images such as header data, metadata, and the like. Examples of imagery file formats may include imagery in the form of National Imagery Transmission Format (NITF)

files, including commercial formats such as NITF 2.1 J2K files or tactical formats such as NITF 2.1 files, and imagery in the form of GeoTIFF files, which may be a public domain metadata standard which allows geo-referencing information to be embedded within a TIFF file. Imagery may also be in the form of National Transport Model (NTM) files, including NTM Segmented Format files (e.g., NITF 2.1 J2K, NITF 2.1 Uncompressed, NITF 2.0 Uncompressed) and NTM Continuous Format files (NITF 2.1 J2K). JPEG 2000 (J2K).

Computing device 2 may include management interface 4, which may be any applications or processes executing on computing device 2 that communicate with management engine 14 of image storage system 12 to access and manage imagery data stored in image storage system 12. Computing device 2 may execute management interface 4 with one processor or with multiple processors. In some examples, computing device 2 may execute management interface 4 as a virtual machine executing on underlying hardware. Management interface 4 may execute as one or more services of an operating system or computing platform or may execute as one or more executable programs at an application layer of a computing platform. Examples of management interface 4 may include standalone applications, web applications running in a web browser, widgets, system-level processes, and the like.

Aspects of the disclosure may incorporate a graphical user interface (GUI) for defining the operator's data retention priorities and the graphical display of those priorities. A GUI that communicate with management engine 14 may enable users to search and screen imagery metadata and to view, edit, and evaluate data retention priorities based on available metadata. Users of computing device 2 may use management interface 4 to access (e.g., view) imagery data stored in image storage system 12 and to view, create, or edit retention policies for the imagery data store in image storage system 12. Management interface 4 may execute at computing device 2 to provide a GUI that users of computing device 2 may utilize to access imagery data, search imagery metadata to locate imagery stored in image storage system 12, search relevancy metadata associated with imagery data stored in image storage system 12, and view, create, and edit retention policies for imagery data stored in image storage system 12.

Aspects of the disclosure are directed to creating an open and modular imagery metadata searching and screening engine that applies image management algorithms to existing and new metadata based on user inputs. The engine may employ a series of filters and logical rule sets that, when applied to imagery holdings in a given system optimizes and/or prioritizes data retention strategies of its storage to meet operational needs of the system.

As shown in FIG. 1, image storage system 12 may include management engine 14 and imagery storage 16. Management engine 14 may be software executed by image storage system 12 that receives imagery from data sources 6 and store the received imagery into imagery storage 16. Management engine 14 may also determine both image metadata associated with the imagery in image storage system 12 as well as relevancy metadata. Image metadata may describe properties and/or characteristics of the images themselves, such as the file type of the image, the size of the image, the date on which the image was taken, the geographic region covered by the image, and the like, while relevancy metadata may describe usage-related details of the imagery as well as various properties of image storage system 12, data sources 6, imagery storage 16, and the like.

In particular, the relevancy metadata may include information regarding the imagery stored in imagery storage 16, data sources 6, and image storage system 12, information regarding current and future missions and objectives, and the like, that may be used to prioritize and maintain relevant imagery based on mission objectives and anticipated future needs. For example, relevancy metadata may include information regarding immediate needs as well as future needs of missions, so that management engine 14 may utilize the relevancy metadata to intelligently manage imagery stored in imagery storage 16 to retain imagery over geographic areas and of targets that are relatively more likely to be of immediate need, while retaining robust coverage of imagery over broader geographic areas of potential future need.

Imagery management engine 14 may also meet the diverse requirements of users and mission objectives, such as intelligence analysis, navigational product creation, precision point geo-positioning, and the like. For example, certain users may require a greater frequency of imagery coverage in certain political or geographic regions, specified as areas or points, while other users may desire longer retention times for imagery with certain photogrammetric characteristics such as obliquity or ground sampling distance (GSD). Such requirements may involve sets of multiple images to meet specific applications, such as multiple image geo-positioning (MIG) tasks. The relevancy metadata determined by management engine 14 as well as the retention policies generated by the imagery management engine 14 may capture such user requirements to determine the retention priorities of imagery in imagery storage 16.

In accordance with aspects of the present disclosure, management engine 14 may prioritize data retention based on a combination of customizable automated strategies and/or optional user-specified retention policies. Management engine 14 may determine active retention policies for the imagery. Retention policies may be filters and rulesets that act upon or are applied to the metadata, including image metadata and/or relevancy metadata, to generate a retention priority value for each image stored in imagery storage 16. Management engine 14 may manage the retention of the imagery stored in imagery storage 16 based at least in part on the active retention policies for the imagery data. In particular, management engine 14 may apply active retention policies to generate a single retention priority value for each image stored in imagery storage 16.

By optimizing data retention strategies of imagery processing system 1's storage, the techniques disclosed herein may more intelligently manage and more efficiently utilize imagery processing system 1's storage space by enabling more relevant imagery to be intelligently retained and less relevant imagery to be deleted from imagery processing system 1's storage space. This may optimize the use of storage space by image processing system 1 by maximizing the amount of storage space available to store relevant imagery, and may increase the reliability and usability of imagery processing system 1 by not deleting data that will likely be requested from imagery processing system 1.

Further, by determining image metadata associated with imagery stored in the image storage system 12, as well as relevancy metadata that may describe properties of the image storage system 12 along with usage-based properties of the imagery stored in the image storage system 12, the techniques disclosed herein may enable faster and more efficient searching of the image storage system 12 to find relevant data, thereby improving performance of imagery processing system 1.

Management engine 14 may determine, based at least in part on the retention priority values associated with the imagery stored in imagery storage 16, which imagery to retain in imagery storage 16 and which imagery to delete from imagery storage 16.

Figure 2:
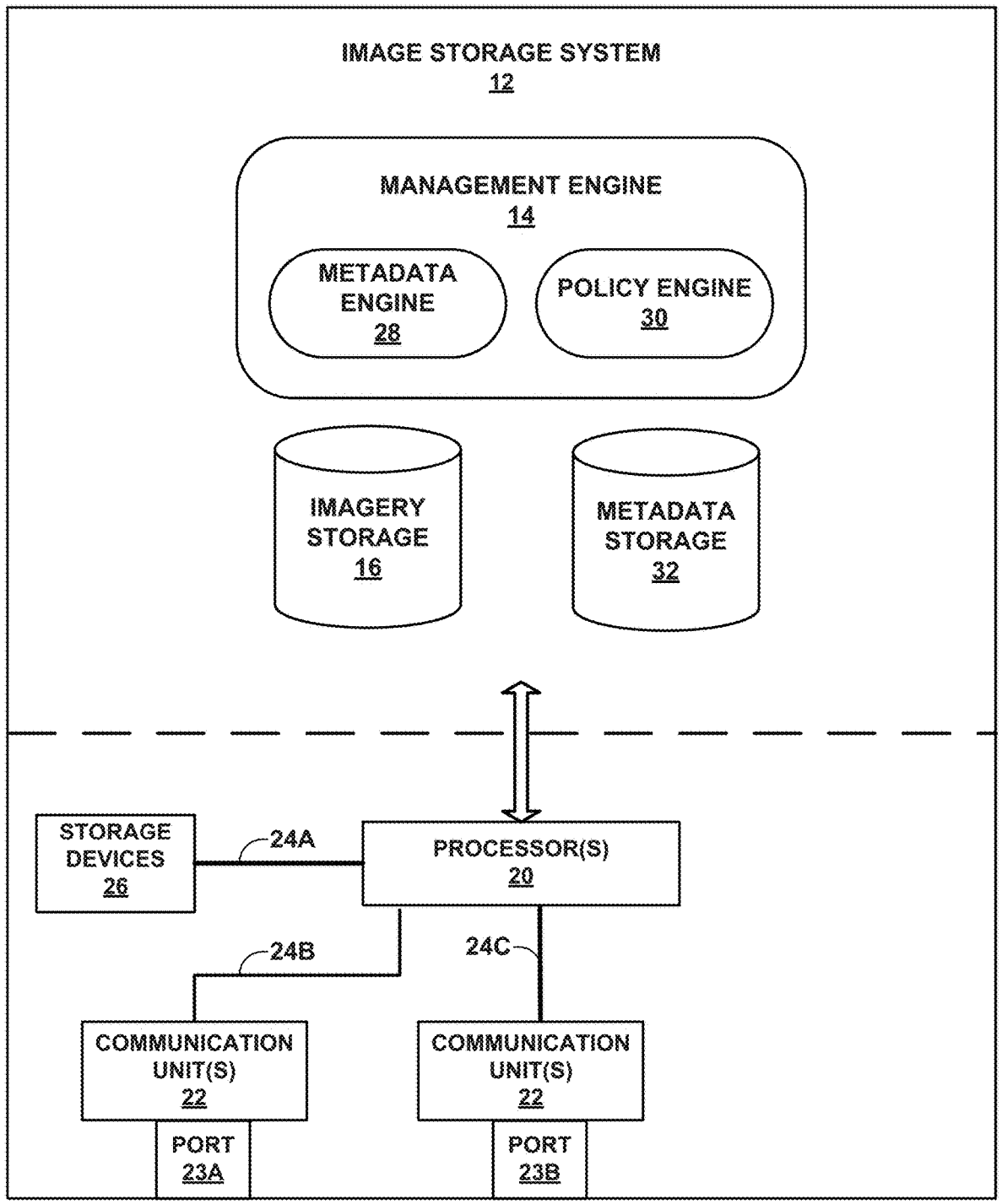
FIG. 2 is a block diagram illustrating details of one example of the image storage system of FIG. 1 that may be configured to manage the retention of imagery stored therein.

FIG. 2 is a block diagram illustrating details of one example of image storage system 12 that may be configured to manage the retention of imagery stored therein. FIG. 2 is described below within the context of FIG. 1. FIG. 2 illustrates only one particular example of image storage system 12, and many other example devices having more, fewer, or different components may also be configurable to perform operations in accordance with techniques of the present disclosure.

While displayed as part of a single device in the example of FIG. 2, components of image storage system 12 may, in some examples, be located within and/or be a part of different devices. For instance, in some examples, image storage system 12 may represent a "cloud" computing system or a "cluster" of computing servers. Thus, in these examples, the modules illustrated in FIG. 2 may span across multiple computing devices. In some examples, image storage system 12 may represent one of a plurality of servers making up a server cluster for a "cloud" computing system.

As shown in the example of FIG. 2, image storage system 12 includes one or more processors 20, one or more communication units 22, ports 23A and 23B, and one or more storage devices 26. Storage devices 26 may store management engine 14, imagery storage 16, and metadata storage 32. Management engine 14, in the example of FIG. 2, includes metadata engine 28 and policy engine 30.

Each of components 20, 22, and 26 may be interconnected (physically, communicatively, and/or operatively) for inter-component communications. In the example of FIG. 2 components 20, 22, and 26 may be coupled by communications channels 24A-24C ("communication channels 24"). In some examples, communications channels 24 may include a system bus, network connection, inter-process communication data structure, or any other channel for communicating data. Management engine 14, imagery storage 16, metadata engine 28, policy engine 30, and metadata storage 32 may also communicate information with one another as well as with other components in image storage system 12.

In the example of FIG. 2, one or more processors 20 may implement functionality and/or execute instructions within image storage system 12. For example, one or more processors 20 may receive and execute instructions stored by storage devices 26 that execute the functionality of management engine 14. These instructions executed by one or more processors 20 may cause image storage system 12 to store information within storage devices 26 during execution. One or more processors 20 may execute instructions of management engine 14 to perform retention management of imagery stored in imagery storage 16. That is, management engine 14 and modules within management engine 14 may be operable by one or more processors 20 to perform various actions or functions of image storage system 12 described herein.

In the example of FIG. 2, one or more communication units 22 may be operable to communicate with external devices (e.g., computing device 2 and data sources 6) via one or more networks (e.g., network 8) by transmitting and/or receiving network signals on the one or more networks. For example, image storage system 12 may use communication units 22 to transmit and/or receive radio signals on a radio network such as a cellular radio network. Likewise, communication units 22 may transmit and/or receive satellite signals on a satellite network such as a global positioning system (GPS) network. Examples of communication units 22 include a network interface card (e.g. such as an Ethernet card), an optical transceiver, a radio frequency transceiver, or any other type of device that can send and/or receive information. Other examples of communication units 22 may include Near-Field Communications (NFC) units, Bluetooth® radios, short wave radios, cellular data radios, wireless network (e.g., Wi-Fi®) radios, as well as universal serial bus (USB) controllers.

Port 23A and 23B may be operably coupled to communication units 22 and may serve as an interface between image storage system 12 and other computers or peripheral devices. For example, port 23A may serve as an interface between image storage system 12 and data sources 6, and port 23B may serve as an interface between image storage system 12 and computing device 2. In some examples, ports 23A and 23B may refer to a physical connection, and in other examples, ports 23A and 23B may refer to logical or wireless connections. Electronically, when ports 23A and 23B refer to a physical connection, several conductors where ports 23A and 23B and physical cable contacts connect may provide a medium to transfer signals between devices. In some examples, ports 23A and 23B may refer to portions of image storage system 12 configured to wirelessly connect with other computing devices in order to exchange information and data packets/streams.

One or more storage devices 26 may be operable, in the example of FIG. 2, to store information for processing during operation of image storage system 12. In some examples, storage devices 26 may represent temporary memory, meaning that a primary purpose of storage devices 26 is not long-term storage. For instance, storage devices 26 of image storage system 12 may be volatile memory, configured for short-term storage of information, and therefore not retain stored contents if powered off. Examples of volatile memories include random access memories (RAM), dynamic random-access memories (DRAM), static random-access memories (SRAM), and other forms of volatile memories known in the art.

Storage devices 26, in some examples, also represent one or more computer-readable storage media. That is, storage devices 26 may be configured to store larger amounts of information than a temporary memory. For instance, storage devices 26 may include non-volatile memory that retains information through power on/off cycles. Examples of non-volatile memories include magnetic hard discs, optical discs, floppy discs, flash memories, or forms of electrically programmable memories (EPROM) or electrically erasable and programmable (EEPROM) memories. In any case, storage devices 26 may, in the example of FIG. 2, store program instructions and/or data associated with management engine 14, metadata engine 28, policy engine 30, metadata storage 32 and imagery storage 16.

In the example of FIG. 2, image storage system 12 may include management engine 14, imagery storage 16, and metadata storage 32. Imagery storage 16 may be any suitable means for storing imagery data received by image storage system 12 from data sources 6. In some examples, imagery storage 16 may be a Redundant Array of Independent Disks (RAID)-based file storage environment that may have a relatively large capacity (e.g., hundreds of terabytes). Although FIG. 2 illustrates a single imagery storage 16, it should be understood that imagery storage 16 may include multiple storage devices, data stores, attached storage, and the like. Further, while FIG. 2 illustrates imagery storage 16 as being on the same storage devices 26 as management engine 14, it should be understood that imagery backend may include storage devices that are external to the storage devices on which management engine 14 is stored. Similarly, metadata storage 32 may be any suitable means for storing metadata, including image metadata and relevancy metadata, that is determined and/or generated by image storage system 12.

Management engine 14 may be a software application (or a collection of software applications) that includes a collection of instructions that performs a task when executed by one or more processors 20. Management engine 14 may be written in any suitable programming language and may be configured to manage the retention of imagery in image storage system 12. Managing the retention of imagery may include determining and assigning retention priority values to each image stored in image storage system 12, where a retention priority value assigned to an image corresponds to the retention priority of the image. Management engine 14 may use the retention priority values assigned to the imagery to determine which imagery to retain and which imagery to discard (e.g., delete) from image storage system 12.

In some examples, a retention priority value may be a numerical value (e.g., 1, 2, 3, etc.). The retention priority of an image may correspond to its retention priority value, such that an image having a relatively lower retention priority value may have a relatively high retention priority, and vice versa. Thus, for example, an image having a retention priority value of 1 may have a relatively higher retention priority than an image having a retention priority value of 2, and so on.

In other examples, the retention priority of an image may inversely correspond to its retention priority value, such that an image having a relatively lower retention priority value may have a relatively low retention priority, and vice versa. In this example, an image having a retention priority value of 1 may have a relatively lower retention priority than an image having a retention priority value of 2, and so on.

The retention priority values associated with the imagery in image storage system 12 may be relative or absolute. Absolute retention priority values may enable the retention priority of imagery to be compared across image storage systems (e.g., with imagery outside of image storage system 12), while relative retention values may indicate the relative retention priority of imagery within a single image storage system (e.g., image storage system 12).

Management engine 14 may utilize the retention priority of imagery when determining which imagery to retain in image storage system 12 and which imagery to discard from image storage system 12. Management engine 14 may make such a determination when it attempts to free up space from imagery storage 16. Management engine 14 may attempt to free up space from imagery storage 16 to make room to store additional imagery received from data sources 6. For example, if image storage system 12 receives 2 gigabytes (GB) of imagery from data sources 6, and if imagery storage 16 has only 1 GB of free space available, management engine 14 may delete 1 GB of imagery from imagery storage 16. Alternatively, management engine 14 may attempt to free up space from imagery storage 16 on a periodic basis. For example, every day at midnight, management engine 14 may delete enough imagery from imagery storage 16 so that imagery storage 16 has a specified amount of free space (e.g., 1 GB) available.

Management engine 14 may determine the retention priority of imagery based at least in part on one or more of properties of imagery stored in image storage system 12, usage patterns of image storage system 12, properties of image storage system 12, and the like. To that end, management engine 14 may include metadata engine 28 that determines metadata that describes such properties as well as policy engine 30 that determines retention policies based on the metadata determined by metadata engine 28.

Metadata engine 28 may also be configured to determine metadata that is used by management engine 14 in conjunction with retention policies to manage retention of imagery in image storage system 12, and may store such metadata in metadata storage 32. Metadata engine 28 may determine two types of metadata: image metadata and relevancy metadata. Image metadata may describe properties or characteristics of imagery stored in image storage system 12. Metadata engine 28 may ingest image metadata from data included in the imagery itself. For example, imagery files itself may include metadata, such as in the headers of the imagery files (e.g., NITF headers). Such image metadata may include information such as the geographic region captured by the imagery, image sensor types of the image capture device used to capture the imagery, the photographic conditions, objects in the imagery, and the like. Metadata engine 28 may also receive or otherwise determine image metadata from other sources. For example, metadata engine 28 may provide a plugin architecture that may interface with external sources of image metadata to receive image metadata from such external sources, interface with metadata extraction tools which may be used to extract additional image metadata, and interface with internal parsing tools to parse image metadata.

Relevancy metadata may be a set of parameters common to each of the images in image storage system 12 that describe the key features determining what makes imagery relevant to analysts and their imagery processing workflows. Because image storage system 12 and management engine 14 may support a wide range of image storage use cases and organizational objectives, the relevancy metadata may capture many types of features about the storage system (e.g., image storage system 12, storage devices 26, and the like), data sources 6 being ingested, user preferences, and organizational objectives.

For example, relevancy metadata may include data regarding the properties of image storage system 12, including properties of components and modules of image storage system 12, properties related to data sources 6 that transmits imagery to image storage system 12, properties related to the usage of image storage system 12, properties related to an imagery ingestion rate, and the like. Relevancy metadata may also include information about the imagery stored in imagery storage 16, including image usage information such as last time accessed and frequency of access. Relevancy metadata may also include information such as the current retention priority values associated with the imagery based on active retention policies as well as a record of historical (i.e., past) retention priority values associated with the imagery. Additional details of relevancy metadata are further described with respect to FIG. 4.

In some examples, metadata engine 28 may determine, generate, and/or update such metadata as the properties described by the metadata changes. For example, metadata engine 28 may update usage-based metadata when images are accessed, and may update metadata that describes properties of image storage system 12 when characteristics of image storage system 12 change (e.g., when a new storage device is added to image storage system 12). In another example, as image storage system 12 ingests imagery from data sources 6, metadata engine 28 may operate to extract image metadata from the ingested imagery and may update metadata that describe relevant properties of image storage system 12, such as the amount of free space in imagery store 16. In other examples, metadata engine 28 may determine, generate, and/or update such metadata on a periodic basis, such as every hour, every day, and the like.

Policy engine 30 may be configured to generate retention policies that are used by management engine 14 to determine retention priority values of imagery in image storage system 12. A retention policy may be a set of filters and logical rulesets that determines the retention priority of imagery in image storage system 12 based at least in part on a set of rules as applied to the metadata determined by metadata engine 28. Policy engine 30 may be configured to generate two types of retention policies: automated retention policies and user-defined retention policies.

Automated retention policies may prioritize images according to general strategies that can be applied automatically to the storage system. For example, an automated retention policy may assign a higher retention priority to more recent imagery, or may prioritize a uniformly distributed, representative subset of imagery over the entire coverage area that meets the storage capacity and newness constraints. One example of an automated retention policy that assigns a higher retention priority to more recent imagery may determine the ingestion date of each imagery in image storage system 12 based on metadata that describes the ingestion date for each image, and may determine the retention priority of each imagery in image storage system 12 based on the associated ingestion date.

One example of an automated retention policy is a uniform coverage policy. The uniform coverage policy may retain imagery that provides the greatest and most recent coverage of all geographic areas monitored by the storage system, while maintaining a safety buffer of free storage space to accommodate unexpected surges of incoming data. The uniform coverage policy may provide a basis for default relevancy-based image management to yield a representative mosaic of imagery across the observable area, which can then be reprioritized based on additional mission-specific objectives. The metadata that may be used in the uniform coverage policy may include metadata that describes storage system properties, such as buffer size, and metadata that describes properties of existing and incoming imagery, such as geolocation, timestamp, data source, and sensor characteristics (i.e., sensor type, resolution, orientation, and other image viewpoint properties).

Another example of an automated retention policy is a usage-based policy, which may refine the behavior of the automated retention policy according to user activity, in order to predict user behavior based on past experiences. The metadata that may be used in this retention policy may include metadata that describes usage of image storage system 12. The idea behind this policy is that popular images tend to be more relevant to organizational objectives. A similar principle motivates well-established memory caching strategies, where limited storage space must be allocated to data that is anticipated to experience highest demand in the near future.

Other examples of an automated retention policy may include hybrid strategies involving combinations of caching strategies, such as the Adaptive Replacement Cache (ARC) algorithm. The ARC algorithm keeps track of both frequently used and recently used data, allocating space to each caching strategy in proportion to its relative success at predicting user demand. The automated retention policies that are active for image storage system 12 may include one or more of, or a combination of one or more of the examples described herein or any other suitable automated retention policies.

User-defined retention policies may be metadata-based set of filters and logical rulesets defined by the user (e.g., a user of computing device 2 via management interface 4) for prioritizing imagery stored in imagery storage 16. Such user-defined retention policies may be defined according to specific purposes, such as mission objectives. The rulesets of a user-defined retention policy may be expressed in terms of operations on available information, such as the image metadata and relevancy metadata. The result of applying a user-defined retention policy may be updating the retention priority of the item.

Policy engine 30 may provide a general syntax for defining the ruleset of a user-defined retention policy, including a set of operators. A ruleset in a user-defined retention policy may be hierarchical. For example, a hierarchical ruleset may include conditional operations, such as an if A, then B condition.

Policy engine 30 may apply active retention policies, including both automated retention policies and user-defined retention policies, to image metadata and/or relevancy metadata to compute a net result that is a single retention priority value for each of the images stored in image storage system 12. Multiple retention policies, including any combination of automated retention policies and user-defined retention policies, may be active at the same time. Management engine 14 may reconcile potentially competing priorities between the multiple active retention policies to achieve consensus amongst active retention policies with different retention goals.

In some examples, some active retention policies may be directed to achieving goals of current mission objectives while other active retention policies may be directed to achieving goals of expected future mission objectives. In particular, mission goals of current mission objectives may be likely to prioritize retaining imagery of localized areas of interest or imagery associated with other highly specialized metadata properties. On the other hand, future mission objectives may potentially only be generally estimated using historical metadata, thereby prioritizing retention of a more representative distribution of imagery across geographic areas and other image features.

Management engine 14 may reconcile these priorities via approaches such as degressively proportional allocation methods, or via other suitable approaches to balance image prioritization goals and reach an equilibrium management strategy that represents a fair compromise. In this way, management engine 14 may define a rigorous process for applying multiple automated and user-defined retention policies that produces image prioritization values consistent with the actual image. In this way, management engine 14 may reconcile multiple competing active retention policies to generate a single retention priority value for each image in image storage system 12.

Management engine 14 may determine the retention priority value of an image in image storage system 12 based at least in part on the weights of one or more rulesets of one or more active retention policies. As discussed above, management engine 14 may utilize one or more active retention policies to determine the retention priority values of images in image storage system 12. A retention policy, such as one of the one or more active retention policies, may include one or more rulesets that are each associated with a respective weight. The weight of a ruleset of an active retention policy may be a numerical value (e.g., between 0 to 100), a percentage value (e.g., between 0% and 100%), and the like.

When a ruleset of an active retention policy indicates that an image should be retained in image storage system 12, management engine 14 may set the retention priority value of the image to be the same as the weight of the ruleset. Conversely, if a ruleset of the active retention policy indicates that an image should be removed from image storage system 12, management engine 14 may set the retention priority value of the image to zero.

For example, if a ruleset is a rule to retain the image in image storage system 12 if the image is less than or equal to 30 days old, and if the ruleset has an associated weight of 90%, then management engine 14 may set the retention priority values of each image in image storage system 12 that is less than or equal to 30 days to 90%. If an active retention policy includes two or more rulesets, management engine 14 may determine the retention priority score for an image as the maximum of the weights associated with the two or more rulesets included in the active retention policy.

Management engine 14 may determine which of the automated retention policies in image storage system 12 are active based at least on the activation thresholds associated with the automated retention policies. The activation threshold of an automated retention policy may be a numerical value (e.g., between 0 to 100), a percentage value (e.g., between 0% and 100%), and the like, and may indicate the percentage of disk space in imagery storage 16 that is occupied (e.g., filled with images). If multiple automated retention policies have the same activation threshold (e.g., the same numerical value), then those multiple automated retention policies may be active at the same time.

In some examples, to reconcile potentially competing priorities between multiple active retention policies, management engine 14 may determine, for an image in image storage system 12, a retention priority score based on each of the multiple active retention policies, and may determine a final retention priority score for the image as an average of the retention priority scores determined based on each of the multiple active retention priorities. In some examples, instead of determining the final retention priority score for the image as the average of the retention priority scores determined based on each of the multiple active retention priorities, management engine 14 may determine the final retention priority score for the image as the maximum retention priority score or the minimum retention priority score out of the retention priority scores determined based on each of the multiple active retention priorities.

Some examples of active retention policies are shown below:
1) Policy: "30 days"; Threshold 75%
   Ruleset: IF (Image.age <=30 days) THEN Keep Image ELSE Remove Image Weight: 90%
2) Policy: "Country of Interest"; Threshold 75%
   Ruleset: IF (Image.country code==A) THEN Keep Image ELSE Remove Image Weight 70%
3) Policy: "Dump 95%"; Threshold: 95%
   Predefined (code): delete images on Remove list.

When the storage space of imagery storage 16 is 75% or more full, then both the "30 days" retention policy and the "Country of Interest" retention policy may become active retention policies. Management engine 14 may apply the active retention policies of "30 days" and "Country of Interest" to the following example images:
   Image 1: less than 30 days old, country code A;
   Image 2: less than 30 days old, country code B;
   Image 3: greater than 30 days old, country code A;
   Image 4: greater than 30 days old, country code B;

Because both the "30 days" policy and the "Country of Interest" policy apply to Image 1, the retention priority value of Image 1 may be an average of the weights associated with the rulesets of "30 days" policy and the "Country of Interest" policy. Thus, management engine 14 may determine the retention priority value of Image 1 to be (90%+70%)/2=80%.

Because only the "30 days" policy applies to Image 2, the retention priority value of Image 2 may be an average of zero and the weight associated with the ruleset of "30 days" policy. Thus, management engine 14 may determine the retention priority value of Image 1 to be (90%+0%)/2=45%.

Because only the "Country of Interest" policy applies to Image 3, the retention priority value of Image 3 may be an average of zero and the weight associated with the ruleset of "Country of Interest" policy. Thus, management engine 14 may determine the retention priority value of Image 1 to be (0%+70%)/2=35%.

Because neither the "30 days" policy nor the "Country of Interest" policy apply to Image 4, the retention priority value of Image 4 may be 0%.

Figure 3:
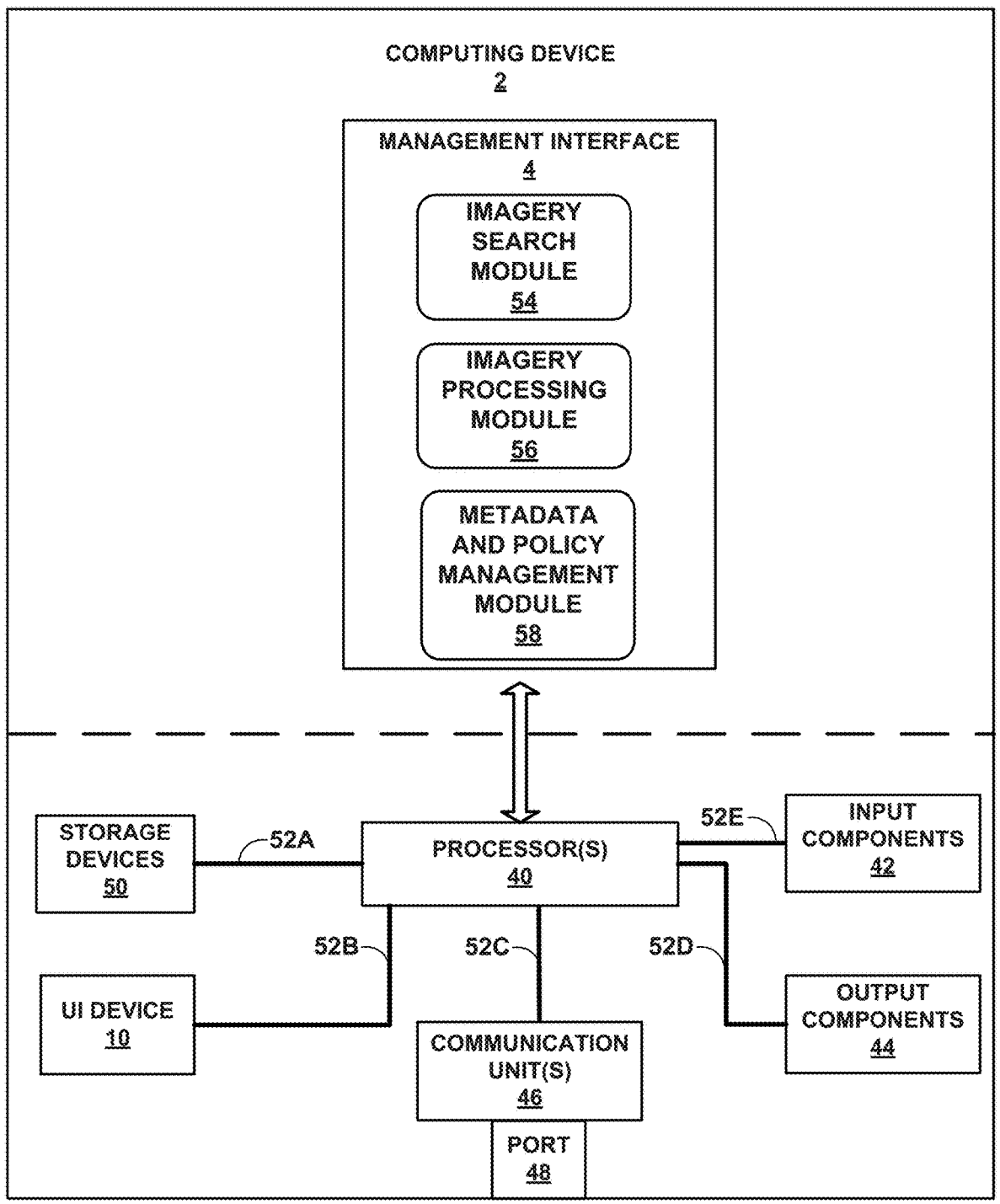
FIG. 3 is a block diagram illustrating details of one example of the computing device of FIG. 1 that may be used by a user to interact with the imagery processing system of FIG. 1 and the image storage system of FIG. 2.

FIG. 3 is a block diagram illustrating details of one example of computing device 2 that may be used by a user to interact with image storage system 12, in accordance with one or more techniques of the present disclosure. FIG. 3 is described below within the context of FIG. 1. FIG. 3 illustrates only one example of computing device 2, and many other example devices having more, fewer, or different components may also be configurable to perform operations in accordance with techniques of the present disclosure.

As shown in the example of FIG. 3, computing device 2 includes user interface (UI) device 10, one or more processors 40, one or more input components 42, one or more output components 44, one or more communication units 46, port 48, and one or more storage devices 50. Each of components 10, 40, 42, 44, 46, 48, and 50 may be interconnected (physically, communicatively, and/or operatively) for inter-component communications. In the example of FIG. 3, components 10, 40, 42, 44, 46, 48, and 50 may be coupled by on communications channels 52A-52E ("communication channels 52"). In some examples, communications channels 52 may include a system bus, network connection, inter-process communication data structure, or any other channel for communicating data. Management interface 4 and modules 54, 56, and 58 may also communicate information with one another as well as with other components in computing device 2.

In the example of FIG. 3, one or more input components 42 may be operable to receive input. Examples of input are tactile, audio, and video input. Input components 42, in one example, include a presence-sensitive or touch-sensitive display, a mouse, a keyboard, a voice responsive system, a video camera, a microphone or other audio sensor, or any other type of device for detecting input from a human or machine.

One or more output components 44 may be operable, in the example of FIG. 3, to generate output. Examples of output are tactile, audio, and video output. Output components 44 of computing device 2, in some examples, include a presence-sensitive display, sound card, video graphics adapter card, speaker, cathode ray tube (CRT) monitor, liquid crystal display (LCD), or any other type of device for generating output to a human or machine.

In some examples, UI device 10 may include functionality of input components 42 and/or output components 44. In the example of FIG. 3, for instance, UI device 10 may be or may include a presence-sensitive input device. In some examples, a presence-sensitive input device may detect an object at and/or near the presence-sensitive input device. As one example range, a presence-sensitive input device may detect an object, such as a finger or stylus that is within two inches or less of the presence-sensitive input device. In another example range, a presence-sensitive input device may detect an object that is six inches or less from the presence-sensitive input device, and other ranges are also possible. The presence-sensitive input device may determine a location (e.g., an (x, y) coordinate) of the presence-sensitive input device at which the object was detected. The presence-sensitive input device may determine the location selected by the input device using capacitive, inductive, and/or optical recognition techniques. In some examples, presence-sensitive input device provides output to a user using tactile, audio, or video stimuli as described with respect to output components 44, and may be referred to as a presence-sensitive display.

While illustrated as an internal component of computing device 2, UI device 10 may also represent an external component that shares a data path with computing device 2 for transmitting and/or receiving input and output. That is, in some examples, UI device 10 may represent a built-in component of computing device 2, located within and physically connected to the external packaging of computing device 2 (e.g., a screen on a mobile phone or wearable computing device). In some examples, UI device 10 may represent an external component of computing device 2, located outside and physically separated from the packaging of computing device 2 (e.g., a monitor, a projector, or other display device that shares a wired and/or wireless data path with computing device 2).

In the example of FIG. 3, one or more communication units 46 may be operable to communicate with external devices, such as image storage system 12, via one or more networks (e.g., network 8) by transmitting and/or receiving network signals on the one or more networks. For example, computing device 2 may use communication units 46 to transmit and/or receive radio signals on a radio network such as a cellular radio network. Likewise, communication units 46 may transmit and/or receive satellite signals on a satellite network such as a global positioning system (GPS) network. Examples of communication unit 46 include a network interface card (e.g. such as an Ethernet card), an optical transceiver, a radio frequency transceiver, or any other type of device that can send and/or receive information. Other examples of communication units 46 may include Near-Field Communications (NFC) units, Bluetooth® radios, short wave radios, cellular data radios, wireless network (e.g., Wi-Fi®) radios, as well as universal serial bus (USB) controllers.

One or more communication units may be operably coupled to port 48. Port 48 may serve as an interface between computing device 2 and other computers or peripheral devices (e.g., image storage system 12). In some examples, port 48 may refer to a physical connection, and in other examples, port 48 may refer to logical or wireless connections. Electronically, when port 48 refers to a physical connection, several conductors where port 48 connects to the contacts of a physical cable may provide a medium to transfer signals between devices. In some examples, port 48 may refer to a portion of computing device 2 configured to wirelessly connect with other computing devices in order to exchange information and data packets/streams.

One or more storage devices 50 may be operable, in the example of FIG. 3, to store information for processing during operation of computing device 2. In some examples, storage devices 50 may represent temporary memory, meaning that a primary purpose of storage devices 50 is not long-term storage. For instance, storage devices 50 of computing device 2 may be volatile memory, configured for short-term storage of information, and therefore not retain stored contents if powered off. Examples of volatile memories include random access memories (RAM), dynamic random-access memories (DRAM), static random-access memories (SRAM), and other forms of volatile memories known in the art.

Storage devices 50, in some examples, also represent one or more computer-readable storage media. That is, storage devices 50 may be configured to store larger amounts of information than a temporary memory. For instance, storage devices 50 may include non-volatile memory that retains information through power on/off cycles. Examples of non-volatile memories include magnetic hard discs, optical discs, floppy discs, flash memories, or forms of electrically programmable memories (EPROM) or electrically erasable and programmable (EEPROM) memories. In any case, storage devices 50 may, in the example of FIG. 3, store program instructions and/or data associated with management interface 4, imagery search module 54, imagery processing module 56, and metadata and policy management module 58.

In the example of FIG. 3, one or more processors 40 may be configured to implement functionality and/or execute instructions within computing device 2. For example, processors 40 may be operable to receive and execute instructions stored at storage devices 50 that implement the functionality of management interface 4, imagery search module 54, imagery processing module 56, and metadata and policy management module 58. These instructions, executed by processors 40, may cause computing device 2 to store information within storage devices 50 (e.g., temporary memories) during program execution. Processors 40 may execute instructions of management interface 4, imagery search module 54, imagery processing module 56, and metadata and policy management module 58 to cause UI device 10 to output, via output components 44, a graphical user interface that may be used by a user, such as by providing input to input components 42, to access the functionalities of management interface 4, imagery search module 54, imagery processing module 56, and metadata and policy management module 58. That is, imagery search module 54, imagery processing module 56, and metadata and policy management module 58 may be operable by processors 40 to perform various actions.

Computing device 2 may, in the example of FIG. 3, include management interface 4. Management interface 4 may be configured to communicate with management engine 14 at image storage system 12 in order to access the metadata, retention policies, and imagery at image storage system 12. To that end, management interface 4 may include imagery search module 54, imagery processing module 56, and metadata and policy management module 58 that may communicate with management engine 14 executing at image storage system 12, such as via communication units 46 over network 8, to perform its functionality. Management interface 4, as well as imagery search module 54, imagery processing module 56, and metadata and policy management module 58 may be software made up of a collection of instructions that performs a task when executed by one or more processors 40, and may be written in any suitable programming language. Management interface 4, as well as imagery search module 54, imagery processing module 56, and metadata and policy management module 58, may be stored in storage devices 50.

Imagery search module 54, imagery processing module 56, and metadata and policy management module 58 may each direct UI device 10 to output a graphical user interface (GUI) for display at a display device operably coupled to computing device 2, so that a user may interact with the GUI to access the functionalities of imagery search module 54, imagery processing module 56, and metadata and policy management module 58. Imagery search module 54 may be configured to search imagery metadata and to locate imagery stored in image storage system 12. Imagery processing module 56 may be configured to process and exploit imagery data stored in image storage system 12. Metadata and policy management module 58 may be configured to enable a user to view, search, and/or edit relevancy metadata associated with the imagery stored in image storage system 12. Metadata and policy management module 58 may enable a user to search and/or query the metadata in image storage system 12, to filter and sort the results of the search and/or query, and to tag fields and values of interest for use in developing retention policies.

Metadata and policy management module 58 may also be configured to enable a user to view, create, and edit retention policies for the imagery stored in image storage system 12, and to view the prioritization of the imagery stored in image storage system 12. For example, metadata and policy management module 58 may cause UI device 10 to output a GUI that enables the user to visualize hierarchical rulesets of retention policies in a tree-like view as expandable trees, and may enable the user to edit such hierarchical rulesets of retention policies. Metadata and policy management module 58 may enable the user to preview the effect that retention policy changes have on the retention priority values of the imagery in image storage system 12 prior to deploying such retention policy changes.

Figure 4:
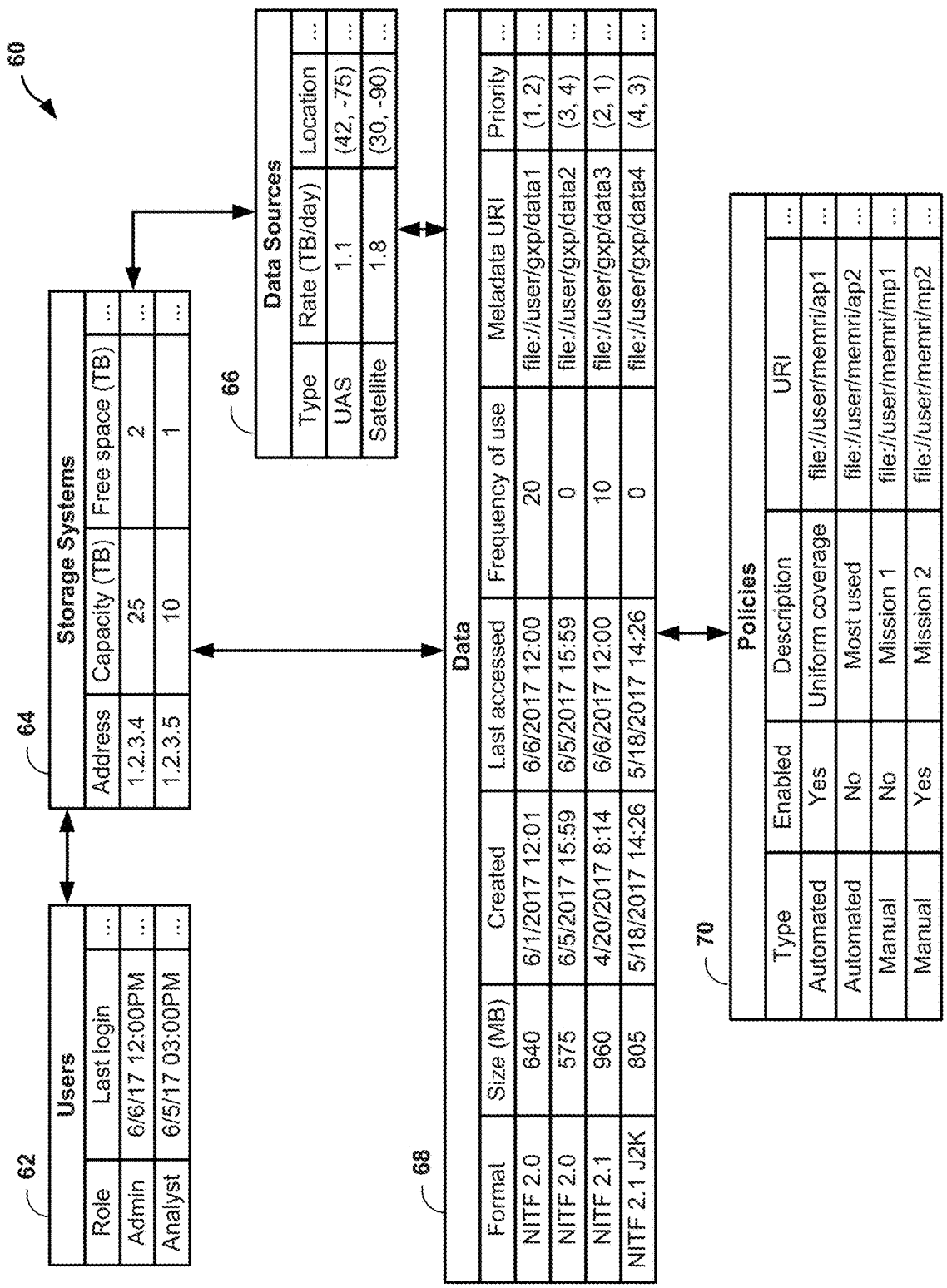
FIG. 4 illustrates example relevancy metadata which may be determined by the metadata engine of the image storage system shown in FIG. 2.

FIG. 4 illustrates example relevancy metadata which may be determined by metadata engine 28 of image storage system 12 shown in FIG. 2. As shown in FIG. 4, relevancy metadata 60 may be implemented as a relational database with appropriately scoped tables for each category of relevancy features, which may enable comprehensive tracking of features related to image relevancy while maintaining a compact storage footprint. Such a relational database implementation of relevancy metadata 60 may be stored in metadata storage 32 of image storage system 12.

Relevancy metadata may describe and/or include data regarding features such as user features 62 related to properties of users of image storage system 12, storage system features 64 related to properties of the storage systems of image storage system 12, data source features 66 related to properties of the data sources from which image storage system 12 ingests imagery, imagery features 68 related to properties of imagery in image storage system 12, and policy features 70 related to the properties of policies in image storage system 12.

User features 62 may include information for each user of image storage system 12, such as their role (e.g., Admin or Analyst) as well as the last time they logged into image storage system 12. Storage system features 64 may include information regarding each storage device of image storage system, such as each storage device making up imagery storage 16, such as their Internet Protocol (IP) address, their storage capacity, and their free space. Data source features 66 may include information regarding each data source (of data sources 6) from which image storage system 12 ingests imagery, such as the data source type, the rate at which image storage system 12 ingests data from the respective data source, as well as the geographic location of the data source.

Imagery features 68 may include information for each image stored in image storage system 12, including usage-related information for each image. For example, imagery features 68 may include information regarding the file format, size, and the date of creation for each image. Imagery features 68 may also include information regarding the last time each imagery was accessed, the frequency of use of each imagery, as well as the file location of image metadata associated with each imagery. Imagery features 68 may also include information regarding historical retention priority values of each imagery, including the current retention priority value of each imagery based on the retention policies that are currently active in image storage system 12.

Policy features 70 may include information for each retention policy in image storage system 12, including information regarding the type of policy (e.g., automated or user-defined), whether the policy is currently active, description of the policy, and the file location of the policy in image storage system 12.

Figure 5:
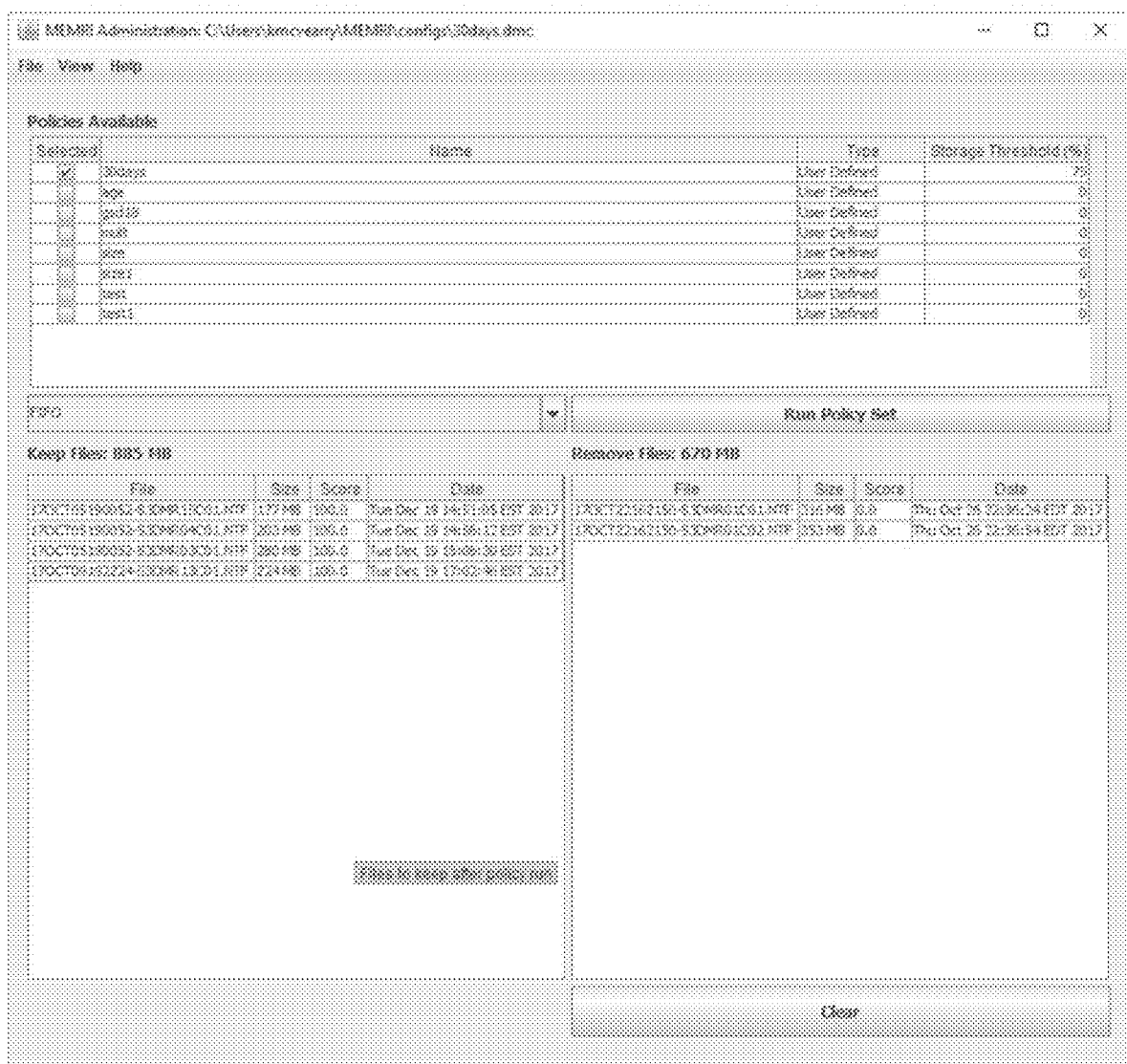
FIG. 5 illustrates an example administrative user interface for administering an example management engine of an image storage system.

FIG. 5 illustrates an example administrative user interface for administering an example management engine of an imagery processing system. Metadata and policy management module 58 of management interface 4 of computing device 2 may cause UI device 10 to output such an example administrative user interface. As shown in FIG. 5, administrative user interface 72 may be a GUI with which a user may interact in order to administer management engine 14 and the images stored in imagery storage 16 of image storage system 12. Administrative user interface 72 may enable the user to select one or more active retention policies, and may provide an indication of the images that are retained in image storage system 12 and the images that are deleted from image storage system 12 as a result of activating a particular retention policy.

As shown in the example of FIG. 5, the "30 days" retention policy with an activation threshold of 75% has been activated. Administrative user interface 72 indicates that when the "30 days" retention policy is active, management engine 14 may retain four files having a total size of 885 Megabytes in image storage system 12, and may delete two files having a total size of 670 Megabytes from image storage system 12.

Figure 6:
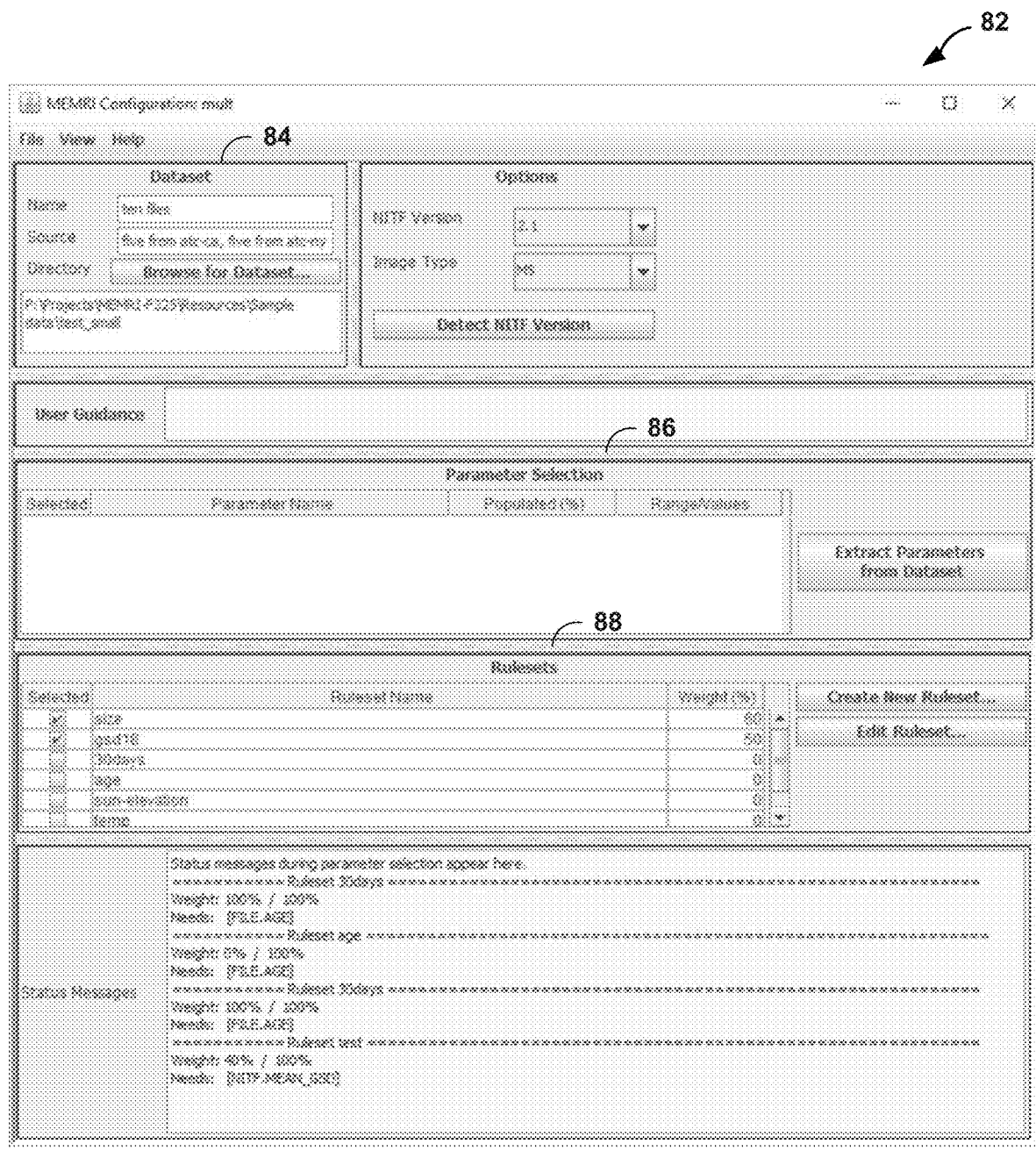
FIG. 6 illustrates an example configuration user interface for configuring an example management engine of an image storage system.

FIG. 6 illustrates an example configuration user interface for configuring an example management engine of an imagery processing system. Metadata and policy management module 58 of management interface 4 of computing device 2 may cause UI device 10 to output such an example configuration user interface. As shown in FIG. 6, configuration user interface 82 may include dataset selection functionality 84 that enables a user to select a dataset from image storage system 12. For example, a dataset may be a set of images that are stored in image storage system 12.

Configuration user interface 82 may also include parameter selection functionality 86 that enables a user to select parameters of the selected dataset. Parameters of the selected dataset may be metadata associated with the images making up the dataset, including image metadata, relevancy metadata, and the like.

Configuration user interface 82 may also include ruleset selection functionality 88 that enables a user to select, edit, and create rulesets to be applied to the selected dataset. The rulesets may be configured to generate retention priority scores for images based on sequences of operations on the selected metadata parameters. Configuration user interface 82 may be used to compose and save a user-defined retention policy by selecting one or more rulesets and assigning relative importance levels, or weights, to the selected rulesets.

Figure 7:
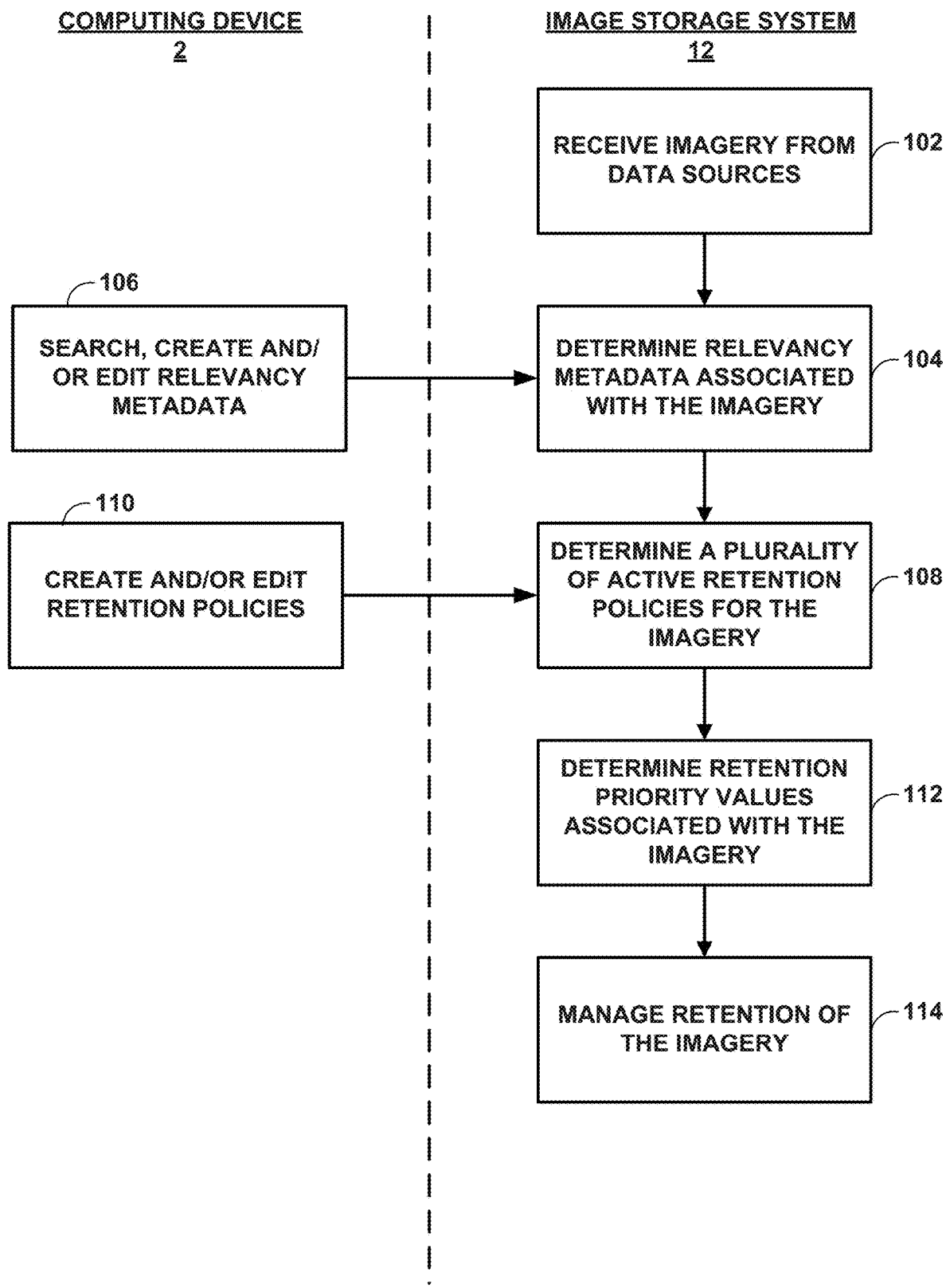
FIG. 7 is a flow chart illustrating an example technique for managing retention of imagery in the imagery processing system shown in FIG. 1.

FIG. 7 is a flow chart illustrating an example technique for managing retention of imagery in image storage system 12. The example technique illustrated by FIG. 5 is described in terms of FIGS. 1-6. As shown in FIG. 7, image storage system 12 may receive imagery from data sources 6 and/or imagery preprocessor 7 (102). Metadata engine 28 of management engine 14 may determine relevancy metadata 60 associated with the imagery stored in an image storage system 12 (104). A user may use computing device 2 to search, create, and/or edit relevancy metadata 60 (106). For example, metadata and policy management module 58 of management interface 4 may cause UI device 10 of computing device 2 to display a GUI that the user may use to search, create, and/or edit relevancy metadata 60.

Management engine 14 of image storage system 12 may determine one or more active retention policies for the imagery based at least in part on the relevancy metadata 60, where the one or more active retention policies may include one or more rulesets that are applied to the relevancy metadata 60 (108). In some examples, the one or more active retention policies includes at least one of: an automated retention policy or a user-specified retention policy. In some examples, the automated retention policy includes at least one of: a uniform coverage policy or a usage-based policy.

A user may use computing device 2 to create or edit user-specified retention policies that may be included in the one or more active retention policies (110). For example, metadata and policy management module 58 of management interface 4 may cause UI device 10 of computing device 2 to display a GUI that the user may use to create or edit retention policies. Management engine 14 may receive from metadata and policy management module 58 of computing device 2 a user-specified retention policy that includes a hierarchical ruleset that is applied to one or more of the relevancy metadata 60.

Management engine 14 may determine retention priority values associated with the imagery stored in the image storage system 12 based at least in part on the one or more active retention policies (112). Management engine 14 may store the retention priority values associated with the imagery in metadata storage 32 as part of relevancy metadata 60, so that relevancy metadata 60 includes indications of historical retention priority values associated with the imagery.

In some examples, the relevancy metadata includes indications of usage patterns associated with the imagery, and determining the retention priority values associated with the imagery stored in the image storage system 12 based at least in part on the one or more active retention policies may include applying the one or more rulesets of the one or more retention policies to the usage patterns associated with the imagery to determine the retention priority values associated with the imagery.

In some examples, the relevancy metadata may include indications of storage system properties associated with the image storage system 12, and determining the retention priority values associated with the imagery stored in the image storage system 12 based at least in part on the one or more active retention policies may include applying the one or more rulesets of the one or more retention policies to the storage system properties associated with the imagery processing system to determine the retention priority values associated with the imagery.

In some examples, management engine 14 may determine the retention priority values associated with the image storage system 12 based at least in part on applying the one or more rulesets of the one or more active retention policies to image metadata associated with the imagery, where the image metadata includes indications of image characteristics associated with the imagery.

In some examples, determining the retention priority values associated with the imagery stored in the imagery processing system based at least in part on the one or more active retention policies may further include reconciling potentially competing priorities between the plurality of active retention policies to generate a single set of the retention priority values associated with the imagery stored in the imagery processing system based at least in part on the one or more active retention policies.

Management engine 14 of image storage system 12 may manage retention of imagery in the image storage system 12 based at least in part on the retention priority values associated with the imagery (114). Managing retention of the imagery in the imagery processing system may include deleting one or more of the images having a lowest retention priority based at least in part on the retention priority values associated with the imagery.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., per a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by at least one processor, relevancy metadata associated with images stored in an imagery processing system;
   determining, by the at least one processor, one or more retention policies for the images based at least in part on the relevancy metadata, wherein the one or more retention policies include one or more rulesets that are to be applied to the relevancy metadata when the one or more retention policies are active and wherein the one or more active retention policies includes at least one of: an automated retention policy that includes a usage-based policy, the usage-based policy being based on at least one of last use of the images or frequency of use of the images or a user-specified retention policy that includes a hierarchical ruleset that is applied to one or more of the relevancy metadata;
   determining, by the at least one processor, whether an activation threshold associated with the one or more retention policies is exceeded, the activation threshold being associated with an amount of disk space that is occupied; activating, by the at least one processor and based on the activation threshold associated with the one or more retention policies being exceeded, the one or more retention policies;
   determining, by the at least one processor, retention priority values associated with the images stored in the imagery processing system based at least in part on the one or more active retention policies by applying the one or more rulesets of the one or more active retention policies to image metadata associated with the images, wherein the image metadata includes indications of image characteristics associated with the images; and
   managing, by the at least one processor, retention of the images in the imagery processing system based at least in part on the retention priority values associated with the images.

2. The method of claim 1, further comprising:
   storing, by the at least one processor, indications of the retention priority values associated with the images in the relevancy metadata, so that the relevancy metadata includes indications of historical retention priority values associated with the images.

3. The method of claim 1, wherein managing the retention of the images further comprises:
   deleting, by the at least one processor, one or more of the images having a lowest retention priority based at least in part on the retention priority values associated with the images.

4. The method of claim 1, wherein the relevancy metadata includes indications of usage patterns associated with the images, and wherein determining the retention priority values associated with the images stored in the imagery processing system based at least in part on the one or more active retention policies further comprises:
   applying, by the at least one processor, the one or more rulesets of the one or more retention policies to the usage patterns associated with the images to determine the retention priority values associated with the images.

5. The method of claim 1, wherein the relevancy metadata includes indications of storage system properties associated with the imagery processing system, and wherein determining the retention priority values associated with the images stored in the imagery processing system based at least in part on the one or more active retention policies further comprises:
   applying, by the at least one processor, the one or more rulesets of the one or more active retention policies to the storage system properties associated with the imagery processing system to determine the retention priority values associated with the images.

6. The method of claim 1, wherein determining the retention priority values associated with the images stored in the imagery processing system based at least in part on the one or more active retention policies further comprises:
   reconciling, by the at least one processor, potentially competing priorities between the plurality of active retention policies to generate a single set of the retention priority values associated with the images stored in the imagery processing system based at least in part on the one or more active retention policies.

7. A computing system comprising: a computer readable storage device; and at least one processor configured to: determine relevancy metadata associated with images stored in an imagery processing system; store the relevancy metadata in the computer readable storage device; determine one or more active retention policies for the images stored in the imagery processing system based at least in part on the relevancy metadata, wherein the one or more active retention policies include one or more rulesets that are to be applied to the relevancy metadata when the one or more retention policies are active and wherein the one or more active retention policies includes at least one of: an automated retention policy that includes a usage-based policy, the usage-based policy being based on at least one of last use of the images or frequency of use of the images or a user-specified retention policy that includes a hierarchical ruleset that is applied to one or more of the relevancy metadata; determine whether an activation threshold associated with the one or more retention policies is exceeded, the activation threshold being associated with an amount of disk space that is occupied; activate, based on the activation threshold associated with the one or more retention policies being exceeded, the one or more retention policies; determine retention priority values associated with the images stored in the imagery processing system based at least in part on the one or more active retention policies by applying the one or more rulesets of the one or more active retention policies to image metadata associated with the images, wherein the image metadata includes indications of image characteristics associated with the images; and manage retention of the images in the imagery processing system based at least in part on the retention priority values associated with the images.

8. The computing system of claim 7, wherein the at least one processor is further configured to:
store indications of the retention priority values associated with the images in the relevancy metadata, so that the relevancy metadata includes indications of historical retention priority values associated with the images.

9. The computing system of claim 7, wherein the at least one processor is further configured to:
apply the one or more rulesets of the one or more retention policies to usage patterns associated with the images to determine the retention priority values associated with the images.

10. The computing system of claim 7, wherein the at least one processor is further configured to:
apply the one or more rulesets of the one or more active retention policies to storage system properties associated with the imagery processing system to determine the retention priority values associated with the images.

11. A computer readable storage medium comprising instructions that, when executed by at least one processor of a computing device, causes the at least one processor to perform operations comprising: determining relevancy metadata associated with of images stored in an imagery processing system; determining one or more active retention policies for the images based at least in part on the relevancy metadata, wherein the one or more active retention policies include one or more rulesets that are to be applied to the relevancy metadata when the one or more retention policies are active and wherein the one or more active retention policies includes at least one of: an automated retention policy that includes a usage-based policy, the usage-based policy being based on at least one of last use of the images or frequency of use of the images or a user-specified retention policy that includes a hierarchical ruleset that is applied to one or more of the relevancy metadata; determining whether an activation threshold associated with the one or more retention policies is exceeded, the activation threshold being associated with an amount of disk space that is occupied; activating, based on the activation threshold associated with the one or more retention policies being exceeded, the one or more retention policies; determining retention priority values associated with the images stored in the imagery processing system based at least in part on the one or more active retention policies by applying the one or more rulesets of the one or more active retention policies to image metadata associated with the images, wherein the image metadata includes indications of image characteristics associated with the images; and managing retention of the images in the imagery processing system based at least in part on the retention priority values associated with the images.

12. The computer readable storage medium of claim 11, wherein the instructions, when executed by the at least one processor of the computing device, further causes the at least one processor to perform operations comprising:
storing indications of the retention priority values associated with the images in the relevancy metadata, so that the relevancy metadata includes indications of historical retention priority values associated with the images.

13. The computer readable storage medium of claim 11, wherein the instructions, when executed by the at least one processor of the computing device, further causes the at least one processor to perform operations comprising:
applying the one or more rulesets of the one or more retention policies to usage patterns associated with the images to determine the retention priority values associated with the images.

14. The computer readable storage medium of claim 11, wherein the instructions, when executed by the at least one processor of the computing device, further causes the at least one processor to perform operations comprising:
applying the one or more rulesets of the one or more active retention policies to storage system properties associated with the imagery processing system to determine the retention priority values associated with the images.

15. The method of claim 1, wherein the one or more retention policies are inactive prior to being activated.

* * * * *